July 30, 1929.　　　　　J. E. GIBBS　　　　　1,722,569

ANIMAL HEATER

Filed Jan. 12, 1928　　　2 Sheets-Sheet 1

J. E. Gibbs, Inventor

By C. A. Snow & Co.
Attorneys.

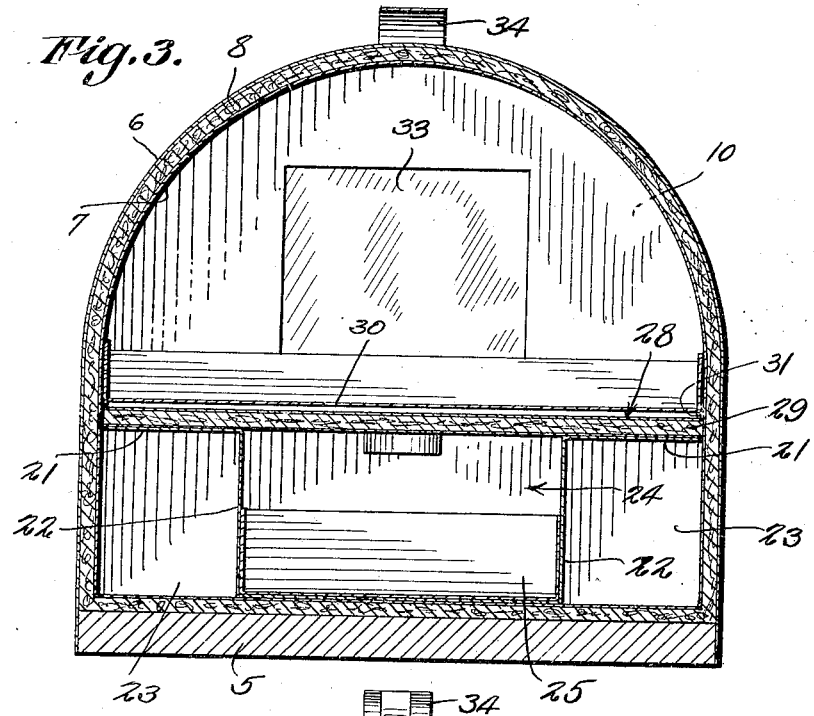
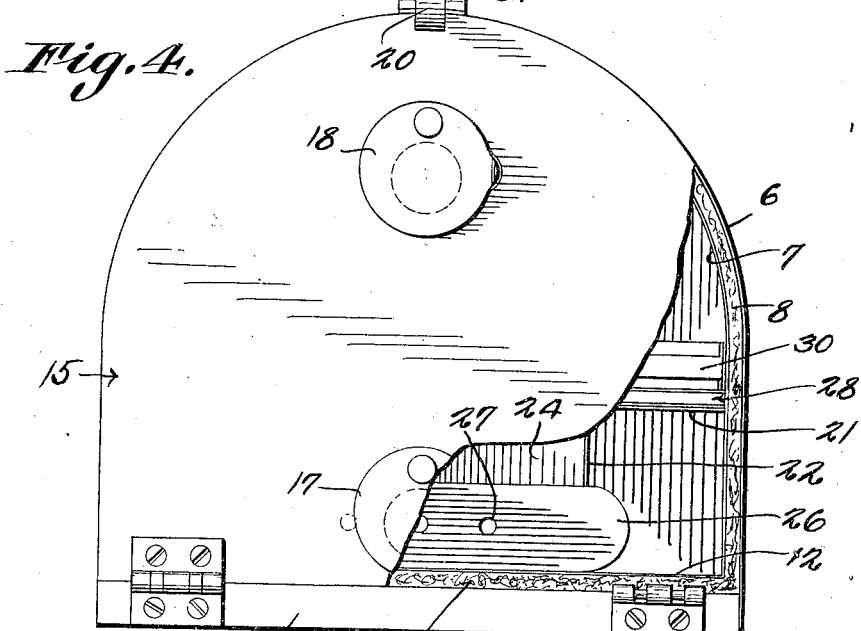

Patented July 30, 1929.

1,722,569

UNITED STATES PATENT OFFICE.

JUDSON E. GIBBS, OF ROCK RIVER, WYOMING.

ANIMAL HEATER.

Application filed January 12, 1928. Serial No. 246,211.

This invention has reference to a heater especially designed for use in treating newly born animals such as lambs or the like animals, the primary object of the invention being to provide means whereby the animal under treatment may be placed in a heater and subjected to the proper temperature to dry the animals.

An important object of the invention is to provide a heater of this character so constructed that a circulation of heat will be insured, to the end that an even temperature will be maintained throughout the entire area of the heater.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 3 is a vertical sectional view taken at right angles to Figure 1.

Figure 4 is a front elevational view, a portion of the hinged closure being broken away.

Figure 1:
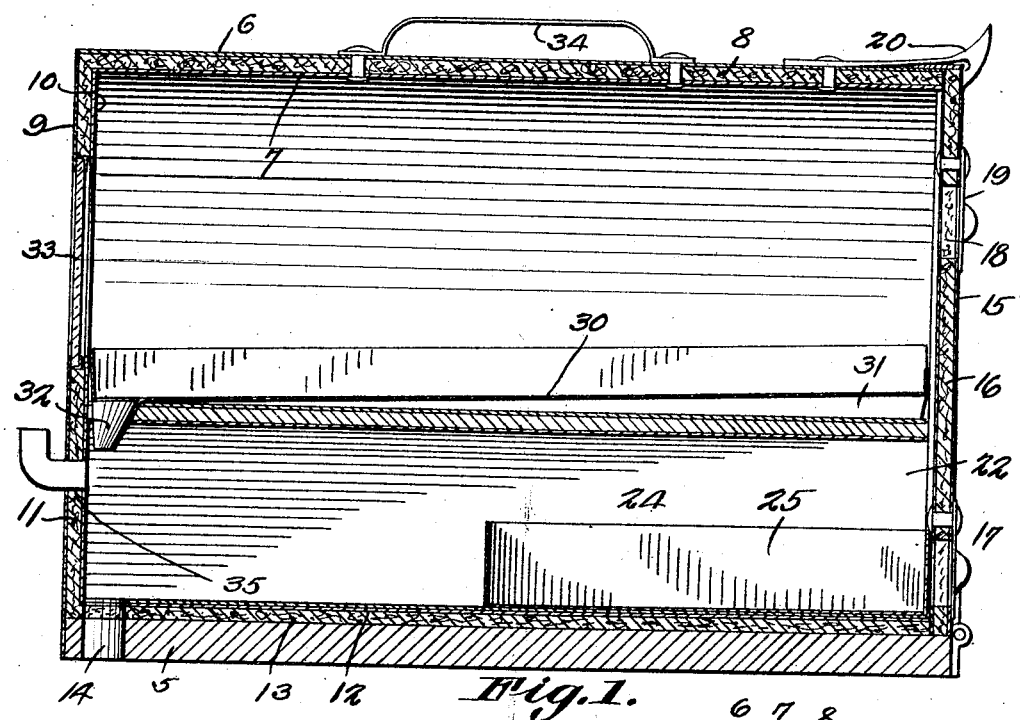
Figure 1 is a vertical sectional view through a heater constructed in accordance with the invention.
Figure 2:
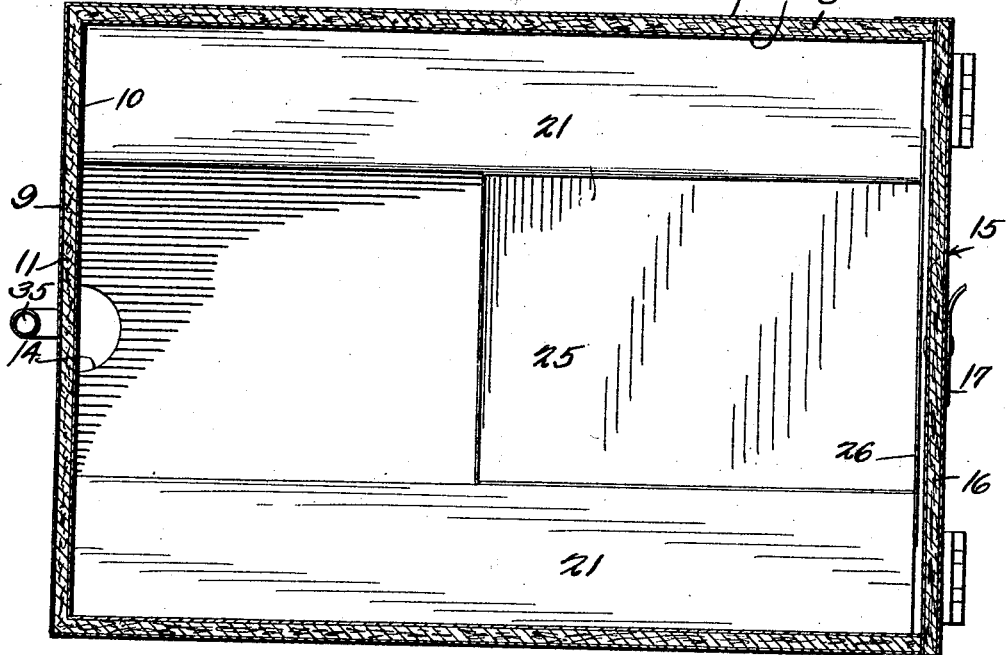
Figure 2 is a transverse sectional view through the heater.

Referring to the drawings in detail, the heater includes a bottom 5 and spaced curved walls 6 and 7 respectively secured to the bottom 5, and held in spaced relation by means of the layer of asbestos indicated at 8.

The rear end of the heater also embodies spaced walls 9 and 10 respectively, between which the layer of asbestos 11 is positioned. A lining plate indicated at 12 is insulated from the bottom 5 by means of the layer of asbestos 13, there being provided a drain opening 14 arranged adjacent to the rear end of the heater and disposed at a point intermediate the side edges thereof, so that liquids may drain from the heater.

The front end of the heater is closed by means of the hinged closure 15 that embodies spaced walls between which the asbestos material 16 is placed. Adjacent to the bottom of the closure is an opening normally closed by means of the hinged closure 17 so that the draft to the fire pan may be regulated to regulate the temperature within the heater.

In order that the heater may be properly ventilated, a ventilating opening 18 is formed adjacent to the upper portion of the closure, the last mentioned opening being normally closed by means of the sliding closure 19.

At the upper end of the heater is an arm 20 or latch adapted to engage the hinged closure to hold the hinged closure in its closed position while the device is in use.

Within the body portion is a horizontal partitioning member formed of a length of sheet metal, the same being bent to provide lateral shelves 21 extending to the sides of the body portion and downwardly extended portions 22 defining longitudinal compartments 23 with the sides of the body portion.

The space between the downwardly extended portions 22 defines a compartment 24 to receive the charcoal pan 25 slidably mounted therein, the charcoal pan being provided with a substantially long front end 26 to contact with the front edges of the downwardly extended portions 22 to restrict inward movement of the pan.

Suitable ventilating openings indicated at 27 are formed in the front end 26 to allow air to enter the charcoal pan to facilitate the burning of the charcoal held therein. Resting on the shelves 21 is a removable partitioning member indicated generally by the numeral 28, which partitioning member includes upper and lower metallic sections held in spaced relation by means of the asbestos layer 29.

This partitioning member 28 provides an insulating member to insulate the removable pan or tray 30 from the direct heat of the heating element used in the pan 25. As shown, the pan or tray is provided with depending lateral flanges 31 which are inclined to support the tray 30 in an inclined position so that liquids may drain from the pan at the rear end thereof.

The drain opening is indicated by the numeral 32 and is disposed directly above the opening 14 so that the liquid will have an unobstructed passage from the heater.

In one end of the heater is a translucent member 33, whereby the interior of the heater may be viewed to insure against over heating or injuring the animals being treated.

An opening 35 is formed in the rear wall so that fumes may pass from the compartment 24 and so that a draft through the compartment 24 will be induced.

In the use of the device, a newly born animal such as a lamb or the like is immediately placed in the tray, it being understood that a suitable heating element such as charcoal or the like is placed in the charcoal pan or firebox to generate heat to heat the interior of the body portion.

When the animal has dried, it is of course removed from the heater and is in a better condition to withstand the elements.

In order that the device may be carried from place to place, a handle 34 is provided on the body portion.

I claim:

1. A heater of the class described including a body portion formed of an outer wall and an inner wall spaced apart to receive an insulating material, a length of sheet metal positioned on the floor of the body portion and having its side edges extended upwardly in spaced relation with the sides of the body portion, the edges of the upwardly extended portions being disposed laterally to define shelves, a removable partitioning member resting on the shelves, the space between the upstanding portions of the length of sheet metal material defining a heating chamber, a removable pan within the heating chamber, a removable tray resting on the partitioning member, and a door for closing the front end of the body portion.

2. A heater of the class described including a body portion, a removable member positioned within the body portion, said removable member embodying upstanding partitioning members spaced from the sides of the body portion, said removable member embodying shelves, a removable partitioning member slidable over the shelves, a tray movable within the body portion for holding a heat generating medium, and a closure for closing the end of the body portion.

In testimony that I claim the foregoing as my own, I have hereto affixed my signature.

JUDSON E. GIBBS.